H. STAUB.
OUTER COVER FOR PNEUMATIC TIRES.
APPLICATION FILED JUNE 12, 1906.

953,303.

Patented Mar. 29, 1910.

Witnesses:
M. Y. L. Higgins
R. W. Helff

Inventor:
Heinrich Staub
by Henry Orth Jr. atty.

UNITED STATES PATENT OFFICE.

HEINRICH STAUB, OF ZURICH, SWITZERLAND, ASSIGNOR TO THE FIRM OF STAUB & CO., OF MÄNNEDORF, SWITZERLAND.

OUTER COVER FOR PNEUMATIC TIRES.

953,303.    Specification of Letters Patent.    Patented Mar. 29, 1910.

Application filed June 12, 1906. Serial No. 321,365.

*To all whom it may concern:*

Be it known that I, HEINRICH STAUB, a citizen of the Republic of Switzerland, residing at Zurich, Switzerland, have invented new and useful Improvements in Outer Covers for Pneumatic Tires, of which the following is a specification.

My invention relates to that class of covers for pneumatic tires, which are secured to the wheel rim by means of a series of metallic hooks secured to the outer edges of the cover and adapted to take under the overturned edges of the wheel rim.

The object of my invention is to provide a cover wherein the securing members serve to lock the overlapping edges of the cover to prevent accidental inward movement of said edges and thereby prevent the disengagement of the securing members from the wheel rim.

Figure 1:
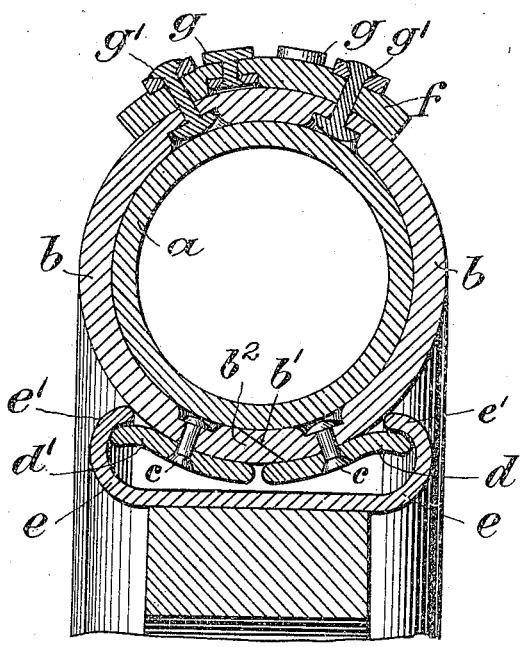
Figure 2:
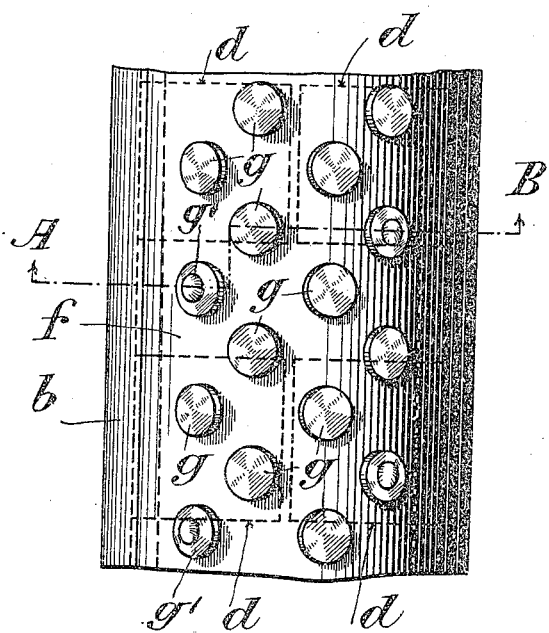

In the accompanying drawing, illustrating my invention: Figure 1 is a vertical section of a cover, tire and wheel rim embodying my invention taken on the line A—B of Fig. 2 and Fig. 2 is a plan view of the same.

Referring to said drawing, $a$ designates an inner tube of any preferred type and $b$ the inclosing cover which may be made of leather or of any preferred material suitable therefor. The cover is formed as an endless belt adapted to extend entirely around the inner tube and has oppositely beveled outer edges $b'$, $b^2$ designed to overlap. A plurality of independent rectangular metal plates $d$, $d'$ are secured on the outside of the cover, at each side of said outer edges, by means of rivets $c$, the heads of which are preferably countersunk in the cover to prevent contact with the inner tube. The plates have a compound curve in cross section and have their major portion conforming to and embracing the cover. The plates $d$ are so mounted with relation to the beveled edge $b'$ that they overlap the outer edge of the bevel, seen in Fig. 1 and form a series of angular recesses along one edge of the cover conforming to the shape of the beveled edge $b^2$. The plates $d'$ are set back from the edge $b^2$ so as to permit the latter to enter the recesses and when the parts are assembled as shown in Fig. 1 the two edges $b'$, $b^2$ are locked together so that inward movement is prevented should the tire become deflated and accidental disengagement of the outer edges of the plates $d$, $d'$ from the rim, caused by pressure on the tread, is prevented.

Owing to the compound curvature of the plates the outer edges thereof or those remote from the longitudinal edges of the cover lie away from the surface of the latter and are adapted to secure the cover to the wheel rim $e$ by taking under the overturned edges $e'$ which are bent back over the rim. The plates $d$, $d'$ lie entirely below the overturned edges within the rim and the combined width of the plates is greater than the width of the space between the overturned edges of the rim and as said plates extend substantially across the rim any lateral movement of the cover is prevented.

The cover is preferably provided with a tread $f$ composed of a strip of leather provided with metal studs $g$ having flat heads projecting beyond its outer surface to form an armor. The tread is secured to the cover by means of studs $g'$, which project through the cover and tread and form part of the armor of the latter.

Owing to the flexibility of the cover it may readily be placed in the rim by inserting the plates on one side of the cover under the overturned edge $e'$ on one side of the rim $e'$ and then exerting sufficient pressure until the outer edges of the plates are near enough together to permit the plates on the opposite side to pass the adjacent overturned edges of the rim. In removing the tire the cover will be flattened as described and simultaneously pulled to first remove the plates on one side. It will readily be seen that no amount of pressure on the tread $f$, even when the tire is deflated, will cause the edges of the cover to move inward.

I claim:—

An outer cover for pneumatic tires having oppositely beveled overlapping meeting edges, a plurality of independent rectangular metal plates on the outside of the cover at each side of the meeting edges thereof, rivets securing the plates to the tire, said plates having a compound curvature in cross section and having their major portion conforming to and embracing the cover, the inner edges of the plates on one edge of the cover overlapping the joint of said meeting edges and thereby locking them against accidental inward movement, in combination with a metal rim having overturned edges taking over the outer edges of the plates whereby said plates lie entirely below said overturned edges within the rim and extend substantially across the latter, the combined width of said plates being greater than the width of the space between the overturned edges of the rim.

In testimony whereof I have signed my name to this specification in the presence of two subscribing witnesses.

HEINRICH STAUB.

Witnesses:
A. LIEBERKNECHT,
E. BLUM.